US007667779B2

(12) United States Patent
Choe et al.

(10) Patent No.: US 7,667,779 B2
(45) Date of Patent: Feb. 23, 2010

(54) IMAGE-DISPLAYING DEVICE AND PIXEL CONTROL METHOD THEREFOR

(75) Inventors: Won-hee Choe, Gyeongju-si (KR); Seong-deok Lee, Suwon-si (KR); Chang-yeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 757 days.

(21) Appl. No.: 11/353,973

(22) Filed: Feb. 15, 2006

(65) Prior Publication Data

US 2006/0181553 A1 Aug. 17, 2006

(30) Foreign Application Priority Data

Feb. 15, 2005 (KR) ...................... 10-2005-0012506
Nov. 16, 2005 (KR) ...................... 10-2005-0109696

(51) Int. Cl.
*H04N 5/21* (2006.01)

(52) U.S. Cl. ........................ 348/712; 348/625; 348/687

(58) Field of Classification Search .......... 348/607–713
See application file for complete search history.

(56) References Cited

U.S. PATENT DOCUMENTS

| | | | | |
|---|---|---|---|---|
| 4,331,971 | A * | 5/1982 | Bretl | 348/628 |
| 7,095,451 | B2 * | 8/2006 | Kitazawa et al. | 348/679 |
| 7,233,307 | B2 * | 6/2007 | Miura et al. | 345/100 |

* cited by examiner

*Primary Examiner*—M. Lee
(74) *Attorney, Agent, or Firm*—Sughrue Mion, PLLC

(57) ABSTRACT

An image-displaying device and a pixel control method therefore are provided. The image-displaying device includes a luminance information extraction unit which is configured to extract luminance information from an image; an image enhancement decision unit which is configured to decide an image enhancement mode based on the extracted luminance information; a pixel control unit which is configured to control a pixel of the image by the decided image enhancement mode; and an image output unit which is configured to output the pixel-controlled image. The method includes extracting luminance information from an image; deciding an image enhancement mode based on the luminance information; controlling each of a plurality of pixels of the image according to the image enhancement mode; and outputting the pixel-controlled image.

20 Claims, 5 Drawing Sheets

IMAGE-DISPLAYING DEVICE AND PIXEL CONTROL METHOD THEREFOR

CROSS-REFERENCE TO RELATED APPLICATIONS

This application claims benefit under 35 U.S.C. § 119(a) of Korean Patent Application No. 2005-12506, filed Feb. 15, 2005 in the Korean Intellectual Property Office, and Korean Patent Application No. 2005-109696, filed Nov. 16, 2005 in the Korean Intellectual Property Office. The entire contents of both Applications are incorporated herein by reference.

BACKGROUND OF THE INVENTION

1. Field of the Invention

The present invention relates to an image-displaying device and a pixel control method therefor, and more particularly, to an image-displaying device and a pixel control method therefor capable of adaptively enhancing brightness and contrast.

2. Description of the Related Art

Information provided to users through image-displaying devices includes not only simple text information but also diverse multimedia information.

In particular, since moving pictures out of the multimedia information of diverse types underlies next-generation Video on Demand (VOD) services or interactive services, studies on related standard specification are actively ongoing.

The developments of digital electronics technologies have digitized conventional analog data, which has brought about technologies for processing diverse digital image materials to efficiently handle the vast digitized data.

Firstly, since all analog devices introduce noise into original signals upon carrying out certain functions thereon, analog signal recording results in image degradation during processing the original signal.

Secondly, digitizing a signal enables computers to be used to process the digitized signal. That is, it becomes possible to process image information compression or the like since the computers process image signals.

Digital image-processing technologies are technologies related to how to display analog results recorded on media on the computers. The possibility of digital images was turned into reality by the digital video interactive (DVI) mode which the RCA research staff had proposed since late 1980s.

The DVI mode can carry out functions difficult for general processors to process in real time by using a special processor carrying out micro-programmable commands suitable for image processing.

Further, the two Experts groups, the joint photographic experts group (JPEG) and the moving pictures experts group (MPEG), established since 1989 defined the standard coding specification having much better functions than the DVI but having difficulties in implementation in software, and such a coding specification is supposed to play an important role in future digital image developments since most manufacturers have supported the specification.

In particular, the MPEG standard is being improved in specification to new versions such as MPEG2 and MPEG3 for image-processing on personal computers as well as for digitization for high-definition system such as high definition television (HDTV).

Further, technologies have been introduced since 1991 for processing images based on the processing capacity of the main processor without extra software purchases, and the QuickTime of Apple, Video for Windows of Microsoft, and Indeo of Intel typically represent such technologies at present. Such image-processing technologies are specifically spotlighted for personal computers thanks to high-speed main processors.

Standardization tasks are accompanied with the introduction to diverse digital image-processing technologies. The digital image-processing technologies are not limited to video-conferencing systems, digital broadcast codec systems, and video telephone technologies, but widely compatible and shared with computer industries, communication industries, and so on.

For example, digital image compression technologies for information storage on optical disc or digital storage media such as CD-ROM are realized by base technologies nearly similar to compression technologies for video conference and the like. Current MPEG standardization is being carried out by ISO-IEC, JTC1, SC1, and WGI11, and the standardization tasks are still progressing since Experts group establishment in 1990s.

As stated above, diverse approaches are being studied for preventing image degradation since the problem of the image degradation is not solved despite advancement of the above-mentioned digital image-processing technologies.

For example, a non-linear incremental function histogram using a luminance signal has been proposed. However, the histogram using a luminance signal has difficulties in that the same is highly likely to cause a flickering phenomenon of estimated and enhanced light source upon application to moving pictures and to cause color distortion. Moreover, it needs an additional color gamut-mapping algorithm.

Further, diverse approaches have been proposed for improving image quality while preventing image degradation, but the approaches have problems in that the approaches can not produce the maximum performance for image enhancement due to lack of consideration of display characteristics of image-displaying devices. The approaches also and have difficulties in maintaining color tones upon general brightness enhancement.

SUMMARY OF THE INVENTION

The present invention has been developed in order to address the above drawbacks and other problems associated with the conventional arrangement. An aspect of the present invention is to provide an image-displaying device and a pixel control method therefor, capable of improving image quality in consideration of display characteristics by controlling brightness and contrast thereof based on luminance information of an input image.

The foregoing and aspects are substantially realized by providing an image-displaying device, comprising a luminance information extraction unit for extracting luminance information from an input image; an image enhancement decision unit for deciding a predetermined image enhancement mode based on the extracted luminance information; a pixel control unit for controlling each pixel of the image by the decided image enhancement mode; and an image output unit for displaying the pixel-controlled image.

The luminance information may include image information density of a luminance saturation area and image brightness distribution of one area for display. The image information density of the luminance saturation area is a density of image information having a luminance value in which the display luminance of the image output unit is saturated. The brightness distribution is a difference value between a maximum output brightness and minimum output brightness.

The pixel control unit may calculate a maximum value of R, G, and B of the pixel, calculate a brightness enhancement ratio based on the calculated maximum value and a predetermined reference value, and decide an enhancement extent by pixel by multiplying each pixel by the calculated brightness enhancement ratio.

The image-displaying device can further comprise a brightness control unit for controlling final brightness of an output image on the image output unit based on brightness and contrast characteristics of the output image.

The brightness control unit may re-arrange luminance distribution characteristics depending on a use state of the image output unit.

The image-displaying device can further comprise a user interface unit for being controlled by a user and sending a signal to the brightness control unit for controlling a brightness dynamic range of the output image on the image output unit.

The image enhancement decision unit may decide a brightness dynamic range of the image for display on the image output unit, and the brightness control unit may input the brightness dynamic range from the image enhancement decision unit and adjust the final brightness of the image for display on the image output unit.

The brightness control unit may further include a light source control unit for controlling a light source, the image enhancement decision unit may decide an light source control amount based on the output image on the image output unit, and the light source control unit may be controlled by the light source control amount from the image enhancement decision unit and may adjust a final light source for the image for display on the image output unit.

The image-displaying device can further comprise a user interface unit for being controlled by the control request signal for the light source of the image for display on the image output unit and sending the control request signal to the image enhancement decision unit.

The foregoing and other aspects are substantially realized by providing a pixel control method for an image-displaying device, comprising extracting luminance information from an input image; deciding a predetermined image enhancement mode based on the extracted image enhancement mode; controlling each pixel of the image by the decided image enhancement mode; and displaying the pixel-controlled image.

The luminance information can include image information density of a luminance saturation area and image brightness distribution of one area for display. The image information density of the luminance saturation area is a density of image information having a luminance value which displaying luminance is saturated. Further, the brightness distribution is a difference value between a maximum output brightness and minimum output brightness.

Controlling each pixel can include calculating a maximum value of R, G, and B of the pixel; calculating a brightness enhancement ratio based on the calculated maximum value and a predetermined reference value; and deciding an enhancement extent by pixel by multiplying each pixel by the calculated brightness enhancement ratio.

The pixel control method can further comprise controlling a final brightness of an output image based on brightness and contrast characteristics of the output image.

In controlling the final brightness of the image, a control request signal is inputted by a user for light source of the image for display.

BRIEF DESCRIPTION OF THE DRAWINGS

The above and other aspects of the present invention will be more apparent by describing certain exemplary embodiments of the present invention with reference to the accompanying drawings, in which.

DESCRIPTION OF EXEMPLARY EMBODIMENTS OF THE PRESENT INVENTION

Hereinafter, the present invention will be described in detail with reference to the accompanying drawings.

Figure 1:
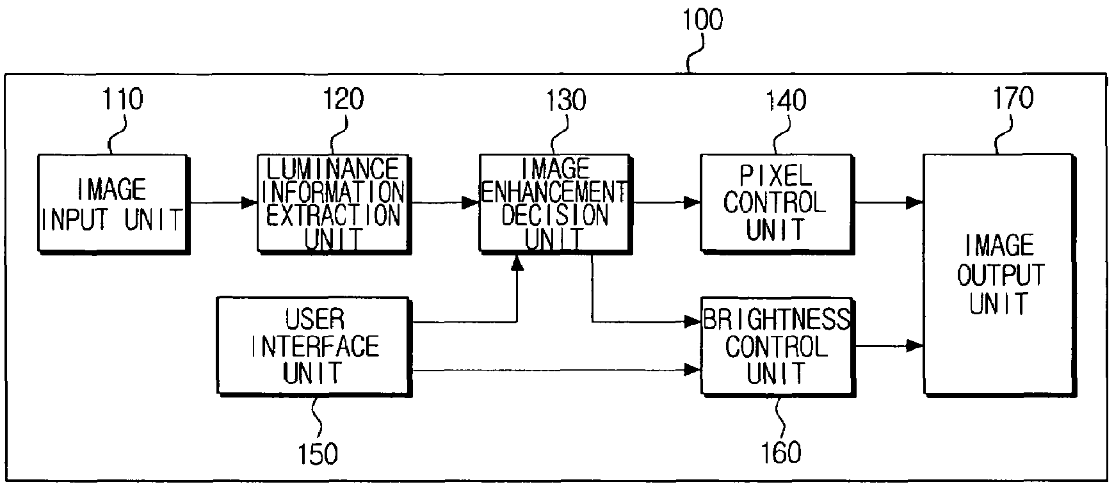
FIG. 1 is a block diagram for showing an image-displaying device according to an exemplary embodiment of the present invention.

FIG. 1 is a block diagram for showing an image-displaying device according to an exemplary embodiment of the present invention.

In FIG. 1, the image-displaying device 100 according to an exemplary embodiment of the present invention has an image input unit 110, a luminance information extraction unit 120, an image enhancement decision unit 130, a pixel control unit 140, a user interface unit 150, a brightness control unit 160, and an image output unit 170.

The image input unit 110 inputs and sends an input image from a certain image source to the luminance information extraction unit 120. Here, the image source can be a computer, a broadcast antenna, a hard disc drive, a digital video disc (DVD) player, a video cassette recorder (VCR) player, a set-top box, or other known source of images in the art.

The luminance information extraction unit 120 extracts luminance information from the input image. That is, the luminance information extraction unit 120 calculates image information density of a luminance saturation area from the input image, and calculates an image brightness distribution of one frame from the input image. Herein, the image information density of the luminance saturation area is a density of image information for display of the input image in an area where a luminance display capability of the image output unit 170 is saturated. Description will be made later in detail about the functions of the luminance information extraction unit 120 with reference to FIG. 3.

The image enhancement decision unit 130 decides a certain image enhancement mode based on the luminance information extracted by the luminance information extraction unit 120, that is, the image information density and the image brightness distribution. Further, the image enhancement decision unit 130 can decide a brightness dynamic range of an image for display on the image output unit 170, using a stored table such as a lookup table. Description will be made later in detail about the functions of the image enhancement decision unit 130 with reference to FIG. 4.

The pixel control unit 140 controls and outputs each pixel of an image based on the certain image enhancement mode decided by the image enhancement decision unit 130. Description will be made later in detail about the functions of the pixel control unit 140 with reference to FIG. 5.

The user interface unit 150 provides an interface between the image-displaying device 100 and a user, and the user can control a light source of the image-displaying device 100 through the user interface unit 150.

The user interface unit 150 can receive a signal for a user's control request over the brightness dynamic range of an image for display on the image output unit 170. Here, the user interface unit 150 sends to the brightness control unit 160 the signal corresponding to the user's control request over the brightness dynamic range. In other words, the user may set a specific brightness level that is within the brightness dynamic range of an image for display. This specific brightness level is then converted into a signal which is sent to the brightness control unit 160.

The brightness control unit 160 controls a final brightness of an image for display on the image output unit 170 in consideration of brightness and contrast characteristics. The brightness control unit 160 can re-arrange luminance distribution characteristics depending on a use state of the image output unit 170.

If the brightness control unit 160 receives the brightness dynamic range from the image enhancement decision unit 130, the brightness control unit 160 controls the final brightness of an image for display on the image output unit 170.

The image output unit 170 outputs and provides to a user an image controlled by the pixel control unit 140 and the brightness control unit 160. Typically, the image is provided to a user by means of a display or other known image output device known in the art.

As above, description has been made of an exemplary embodiment wherein the brightness control unit 160 has no light source control unit, as in FIG. 1, such as Plasma Display Panel (PDP) and Organic Light-Emitting Diode (OLED).

However, with reference now to FIG. 2, description will be made of a brightness control unit 160 having a light source control unit. The brightness control unit 160 containing a light source control unit may be a Liquid Crystal Display (LCD), a Digital Light Processing (DLP), and a Laser Display (LD), for example.

Figure 2:
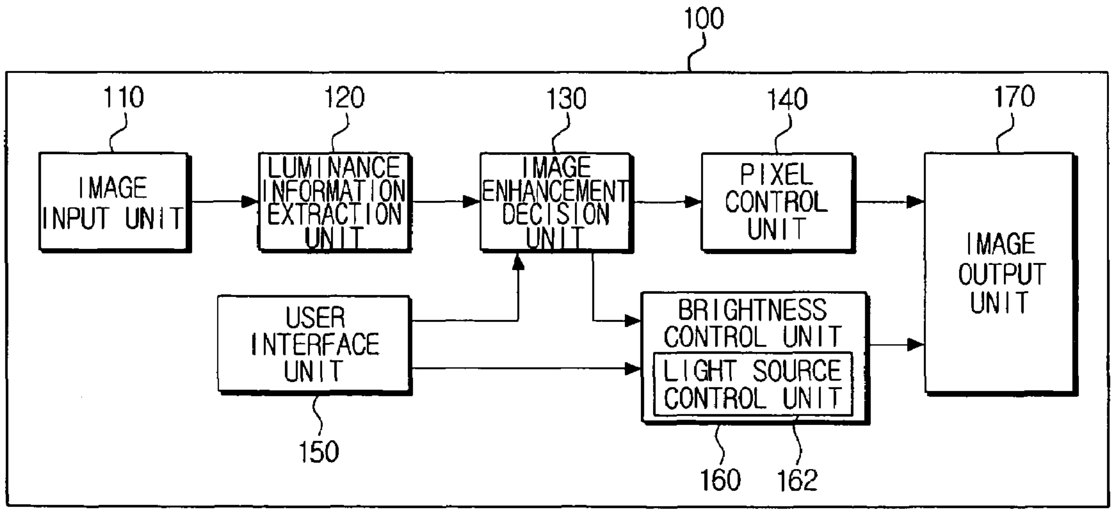
FIG. 2 is a block diagram for showing an image-displaying device according to another exemplary embodiment of the present invention.

FIG. 2 is a block diagram for showing an image-displaying device according to an exemplary embodiment of the present invention.

In FIG. 2, the image-displaying device 100 according to another exemplary embodiment of the present invention has the image input unit 110, the luminance information extraction unit 120, the image enhancement decision unit 130, the pixel control unit 140, the user interface unit 150, the brightness control unit 160, and the image output unit 170. Further, the brightness control unit 160 includes a light source control unit 162.

As described above, FIG. 2 shows that another exemplary embodiment of the present invention has a structure similar to the image-displaying device 100 shown in FIG. 1, so description will be made only of the structure which is different from the structure of the image-displaying device 100 shown in FIG. 1. Further, like components will be given like reference numerals.

The image enhancement decision unit 130 decides a control amount of a light source for an image for display on the image output unit 170. The image enhancement decision unit 130 can decide the light source control amount using a stored table in consideration of characteristics of the image output unit 170. Further, the image enhancement decision unit 130 receives from the user interface unit 150 a signal representing a control request governing the light source, through which the image enhancement decision unit 130 can decide the light source control amount.

The user interface unit 150 inputs from a user a signal representing a control request to control the light source for an image for display on the image output unit 170, and sends to the image enhancement decision unit 130 the control request signal over the light source.

The brightness control unit 160 controls a final brightness of an image for display on the image output unit 170 in consideration of brightness and contrast, as in FIG. 1. However, the brightness control unit 160 according to the present exemplary embodiment has a structure including the light source control unit 162.

The light source control unit 162 controls the light source for an image for display on the image output unit 170, which receives the light source control amount from the image enhancement decision unit 130 and can control a final light source for the image.

Figure 3:
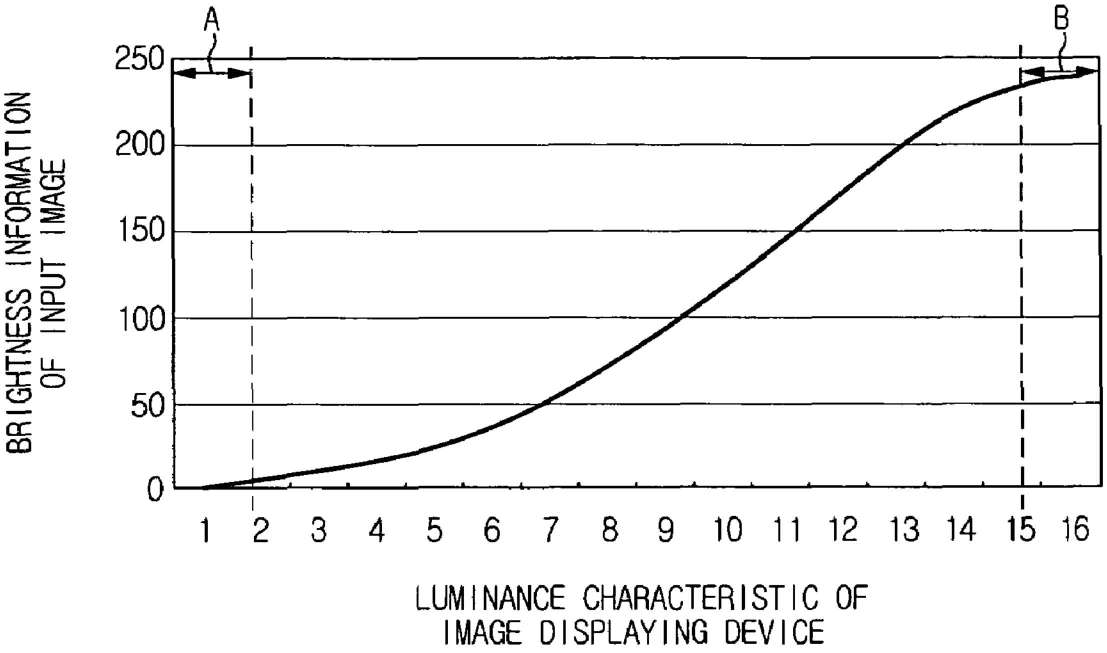
FIG. 3 is a graph for explaining a function of the luminance information extraction unit shown in FIG. 1.

FIG. 3 is a graph for explaining a function of the luminance information extraction shown in FIG. 1.

FIG. 3 is a graph for showing a relationship between brightness information of the image which is input through the image input unit 110 and luminance characteristic of the image-displaying device 100, with reference to which description will be made below on a method for extracting luminance information by the luminance information extraction unit 120.

As shown in FIG. 1, luminance information extracted by the luminance information extraction unit 120 includes image information density of a luminance saturation area and image brightness distribution of one frame.

In FIG. 3, luminance saturation areas A and B are indicated by arrows. As shown in FIG. 3, the luminance saturation areas A and B can be referred to as output brightness non-change intervals. However, the luminance saturation areas A and B are not intervals without output brightness changes, but can be referred to as intervals with changes to such an extent that a user can not recognize the change since the changes are so small compared to the other intervals.

Image information density of the luminance saturation areas A and B of luminance information extracted by the luminance information extraction unit 120 can be calculated as a sum value, $CLR_{tot}$, of the number of pixel frequencies of input image.

$$CLR_{tot}=CLR1+CLR2, \quad \text{Equation 1}$$

wherein, CLR1 denotes the number of pixel frequencies of an input image in the interval A, and CLR2 denotes the number of pixel frequencies of the input image in the interval B.

An Image brightness distribution of one frame out of the luminance information extracted by the luminance information extraction unit 120 can be calculated as a difference value, $Lumin_{diff}$, between a maximum output brightness and a minimum output brightness, which can be expressed in Equation 2 as below.

$$Lumin_{diff}=Lumin_{low}-Lumin_{high} \quad \text{Equation 2}$$

wherein $Lumin_{low}$ denotes a minimum value of the output brightness, and $Lumin_{high}$ denotes a maximum value of the output brightness.

Figure 4:
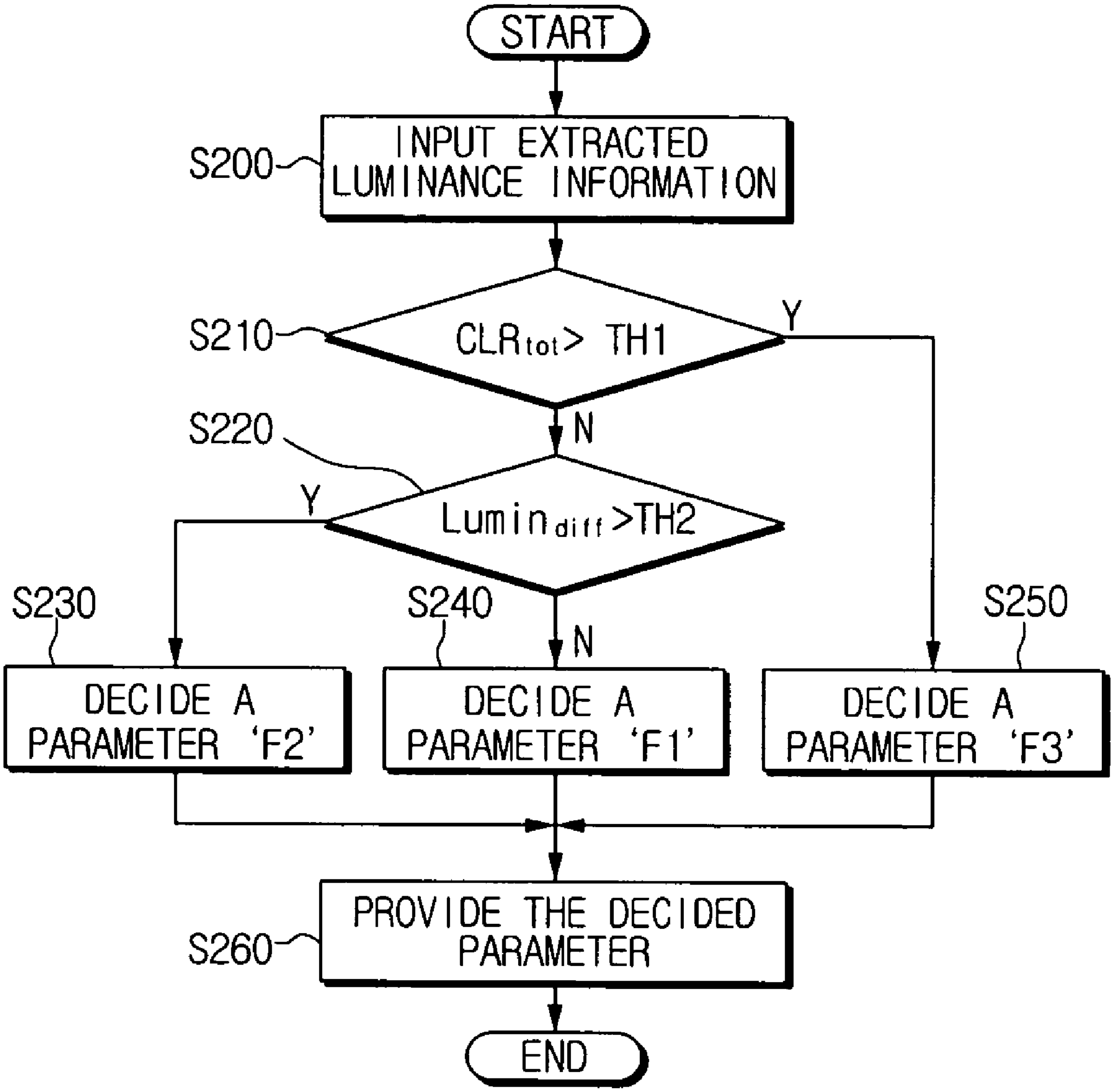
FIG. 4 is a flow chart for explaining a function of the image enhancement decision unit shown in FIG. 1.

FIG. 4 is a flow chart for explaining a function of the image enhancement decision unit shown in FIG. 1.

Description will now be made of a method for deciding an image enhancement mode in the image enhancement decision unit 130 with reference to FIGS. 1 to 3.

If the luminance information is calculated by the luminance information extraction unit 120, that is, the image information density $CLR_{tot}$ of the luminance saturation area and the image brightness distribution $Lumin_{diff}$ of one frame, the image enhancement decision unit 130 decides a certain image enhancement mode based on the input luminance information $CLR_{tot}$ and $Lumin_{diff}$.

In more detail, if the luminance information $CLR_{tot}$ and $Lumin_{diff}$ is input from the luminance information extraction unit 120 to the image enhancement decision unit 130 (S200), the image enhancement decision unit 130 compares the image information density $CLR_{tot}$ of the luminance saturation area with a predetermined first threshold value TH1 for the first time (S210).

If the image information density $CLR_{tot}$ of the luminance saturation area is larger than the first threshold value TH1 in operation S210, a parameter is decided to be "F3" (S250).

If the image information density $CLR_{tot}$ of the luminance saturation area is not larger than the first threshold value TH1, the image enhancement decision unit 130 compares the image brightness distribution $Lumin_{diff}$ of one frame with a predetermined second threshold value TH2 (S220).

If the image brightness distribution $Lumin_{diff}$ of one frame is larger than the second threshold value TH2 in operation S220, the parameter is decided to be "F2" (S230). If the image brightness distribution $Lumin_{diff}$ of one frame is not larger than the second threshold value TH2, the parameter is decided to be "F1" (S240).

The image enhancement decision unit 130 provides the pixel control unit 140 with a selected one of predetermined image enhancement modes based on one of the parameters F1 to F3 decided as above (S260).

Figure 5:
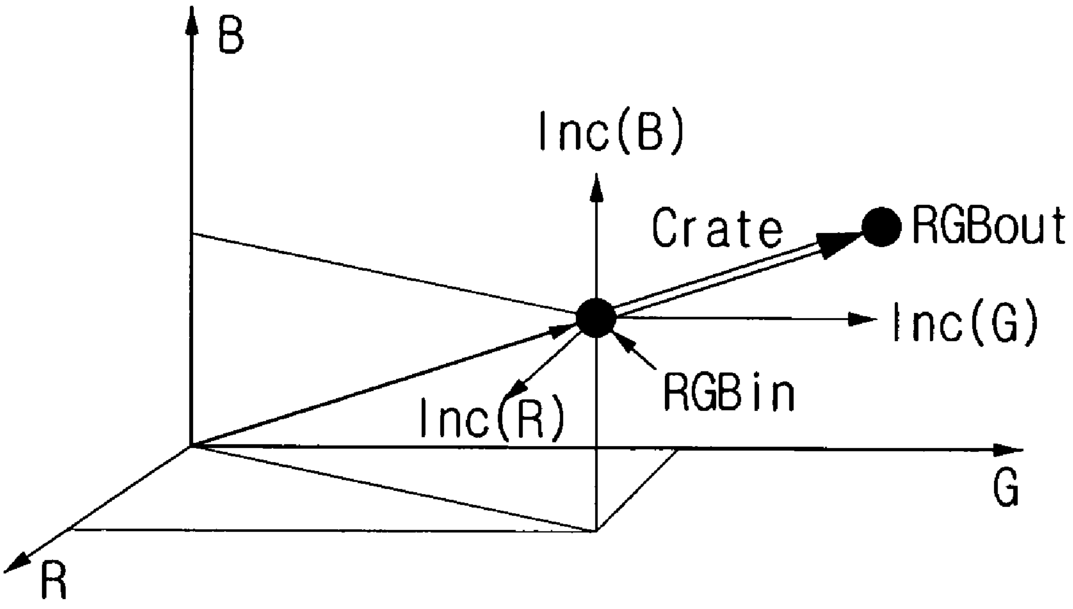
FIG. 5 is a view explaining a function of the pixel control unit shown in FIG. 1.

FIG. 5 is a view for explaining a function of the pixel control unit shown in FIG. 1.

The pixel control unit 140 controls and outputs each pixel of an image to the image output unit 170 by a selected one of predetermined image enhancement modes based on one parameter decided by the image enhancement decision unit 130.

The pixel control unit 140 calculates the maximum value of the RGB of input pixels or a displayable maximum value of the pixel values for display of an image signal, calculates a brightness enhancement ratio based on the calculated maximum value and a predetermined reference value, and multiplies each pixel by the calculated brightness enhancement ratio, thereby deciding an enhancement extent by pixel, which can be expressed in Equation 3.

$$Y_{in} =^{\mathrm{MAX}} (RGB_{in}) \qquad \text{[Equation 3]}$$

$$Y_{out} = Y_{in} +^{SF} (Y_{in}) \times G_{aim}$$

$$C_{rate} = \frac{Y_{out}}{Y_{in}}$$

$$RGB_{out} = RGB_{in} \times C_{rate}$$

wherein, $RGB_{in}$ denotes the RGB of the input pixels, and $Y_{in}$ denotes the maximum value of the RGB of the input pixels.

Further, SF is a selected one of the predetermined image enhancement modes based on one parameter decided by the image enhancement decision unit 130, $C_{rate}$ denotes a brightness enhancement ratio, $Y_{out}$ is a reference value, and $RGB_{out}$ is an RGB of an output pixel.

Figure 6:
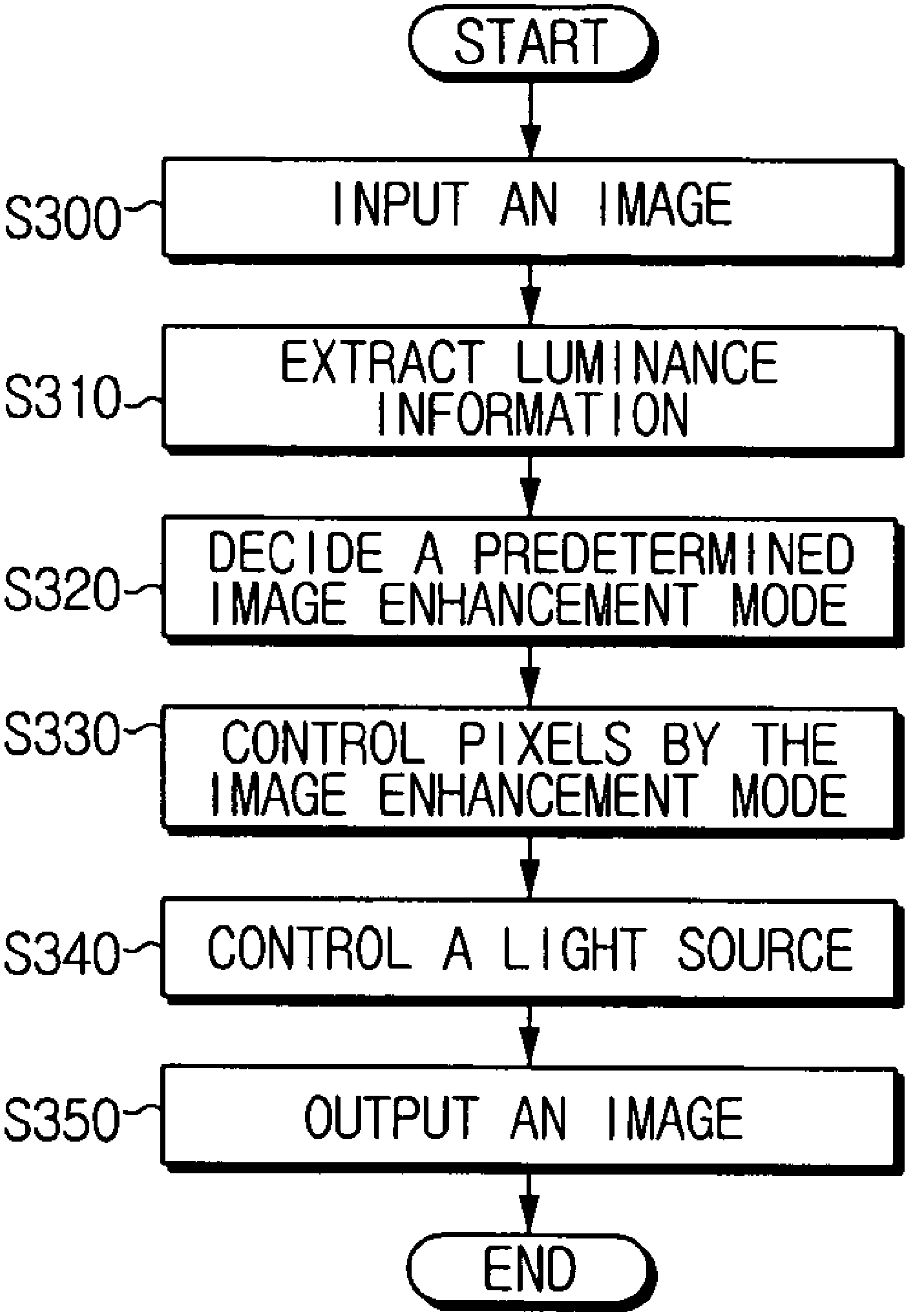
FIG. 6 is a flow chart for explaining a pixel control unit for image-displaying devices according to an exemplary embodiment of the present invention.

FIG. 6 is a flow chart for explaining a pixel control method for an image-displaying device according to an exemplary embodiment of the present invention. Description will now be made of the pixel control method for an image-displaying device according to an exemplary embodiment of the present invention, with reference to FIGS. 1 to 6.

An image is input to the image input unit 110 from a certain image source, and the image input unit 110 sends the input image to the luminance information extraction unit 120 (S300).

If the image is received from the image input unit 110, the luminance information extraction unit 120 calculates the sum value $CLR_{tot}$ of the number of pixel frequencies of the input image and a difference value $Lumin_{diff}$ of the maximum output brightness and minimum output brightness, and outputs the calculated luminance information to the image enhancement decision unit 130 (S310).

If the calculated luminance information calculated by the luminance information extraction unit 120 is received, the image enhancement decision unit 130 decides a predetermined image enhancement mode as described in FIG. 4 (S320).

If the image enhancement decision unit 130 decides the image enhancement mode, the pixel control unit 140 controls each pixel of the input image based on the decided image enhancement mode as explained in FIG. 5 (S330).

The light source control unit 162 can control the light source prior to display of the pixels controlled by the pixel control unit 140 (S340). The light source may be controlled according to a user's request through the user interface unit 150 (not shown).

If the pixel control unit 140 has controlled each pixel and the light source unit 162 has controlled the light source, the image output unit 170 outputs a final image (S350).

As aforementioned, the image-displaying device and the pixel control method therefor according to the present invention apply luminance information of an image, that is, an image information density of luminance saturation areas and an image brightness distribution of one frame, thereby adaptively enhancing brightness and contrast depending on the image. Further, the present invention can enhance the brightness and contrast regardless of luminance degradation of the image-displaying device as well as prevent image degradation.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image-displaying device comprising:

a luminance information extraction unit which is configured to extract luminance information, including an image information density of a luminance saturation area and an image brightness distribution of an area for display, from an image;

an image enhancement decision unit which is configured to decide an image enhancement mode based on a result of comparing at least one of the image information density and the image brightness distribution with a predetermined threshold value;

a pixel control unit which is configured to control a pixel of the image by the decided image enhancement mode; and an image output unit which is configured to output the pixel-controlled image.

2. The image-displaying device as claimed in claim 1, wherein the pixel-controlled image is output on a display device.

3. The image-displaying device as claimed in claim 1, wherein the image information density is a density of image information having a luminance value wherein a luminance display capability of the image output unit is saturated.

4. The image-displaying device as claimed in claim 1, wherein the brightness distribution is a difference value between a maximum output brightness and a minimum output brightness.

5. The image-displaying device as claimed in claim 1, wherein the pixel control unit calculates a maximum value of R, G, and B of a plurality of pixels of the image, calculates a brightness enhancement ratio based on the calculated maximum value and a reference value, and decides an enhancement extent for each one of the plurality of pixels by multiplying each one of the plurality of pixels by the calculated brightness enhancement ratio.

6. The image-displaying device as claimed in claim 1, further comprising a brightness control unit which is configured to control a final brightness of an output image on the image output unit based on characteristics of the output image.

7. The image-displaying device as claimed in claim 6, wherein the characteristics are brightness and contrast.

8. The image-displaying device as claimed in claim 6, wherein the brightness control unit re-arranges luminance distribution characteristics depending on a use state of the image output unit.

9. The image-displaying device as claimed in claim 6, further comprising a user interface unit which is configured to receive control information and to send a signal based on the control information to the brightness control unit for controlling a brightness dynamic range of the output image.

10. The image-displaying device as claimed in claim 6, wherein the image enhancement decision unit decides a brightness dynamic range of the image for display on the image output unit, and the brightness control unit receives the brightness dynamic range from the image enhancement decision unit and adjusts the final brightness of the image for output to the image output unit.

11. The image-displaying device as claimed in claim 8, wherein the brightness control unit further includes a light source control unit which is configured to control a light source, and the image enhancement decision unit decides a light source control amount, and the light source control unit adjusts a final light source for the image for display on the image output unit based on the light source control amount.

12. The image-displaying device as claimed in claim 11, further comprising a user interface unit which is configured to receive control information, and to send a control request signal based on the control information to the image enhancement decision unit.

13. A pixel control method for an image-displaying device comprising:

extracting luminance information, including an image information density of a luminance saturation area and an image brightness distribution of an area for display, from an image;

deciding an image enhancement mode based on a result of comparing at least one of the image information density and the image brightness distribution with a predetermined threshold value;

controlling each of a plurality of pixels of the image according to the image enhancement mode; and outputting the pixel-controlled image.

14. The pixel control method as claimed in claim 13, wherein the image information density is a density of image information having a luminance value wherein a luminance display capability of the image output unit is saturated.

15. The pixel control method as claimed in claim 13, wherein the image brightness distribution is a difference value between a maximum output brightness and a minimum output brightness.

16. The pixel control method as claimed in claim 13, wherein controlling each of a plurality of pixels comprises:

calculating a maximum value of R, G, and B of the plurality of pixels of the image;

calculating a brightness enhancement ratio based on the calculated maximum value and a reference value; and deciding an enhancement extent for each of the plurality of pixels by multiplying each of the plurality of pixels by the calculated enhancement ratio.

17. The pixel control method as claimed in claim 13, further comprising controlling a final brightness of an output image based on characteristics of the output image.

18. The pixel control method as claimed in claim 17, wherein the characteristics are brightness and contrast.

19. The pixel control method as claimed in claim 17, wherein the final brightness of the output image is controlled according to a control request signal.

20. The pixel control method as claimed in claim 19, wherein the control request signal represents a light source of the image for output.

* * * * *